Patented May 19, 1953

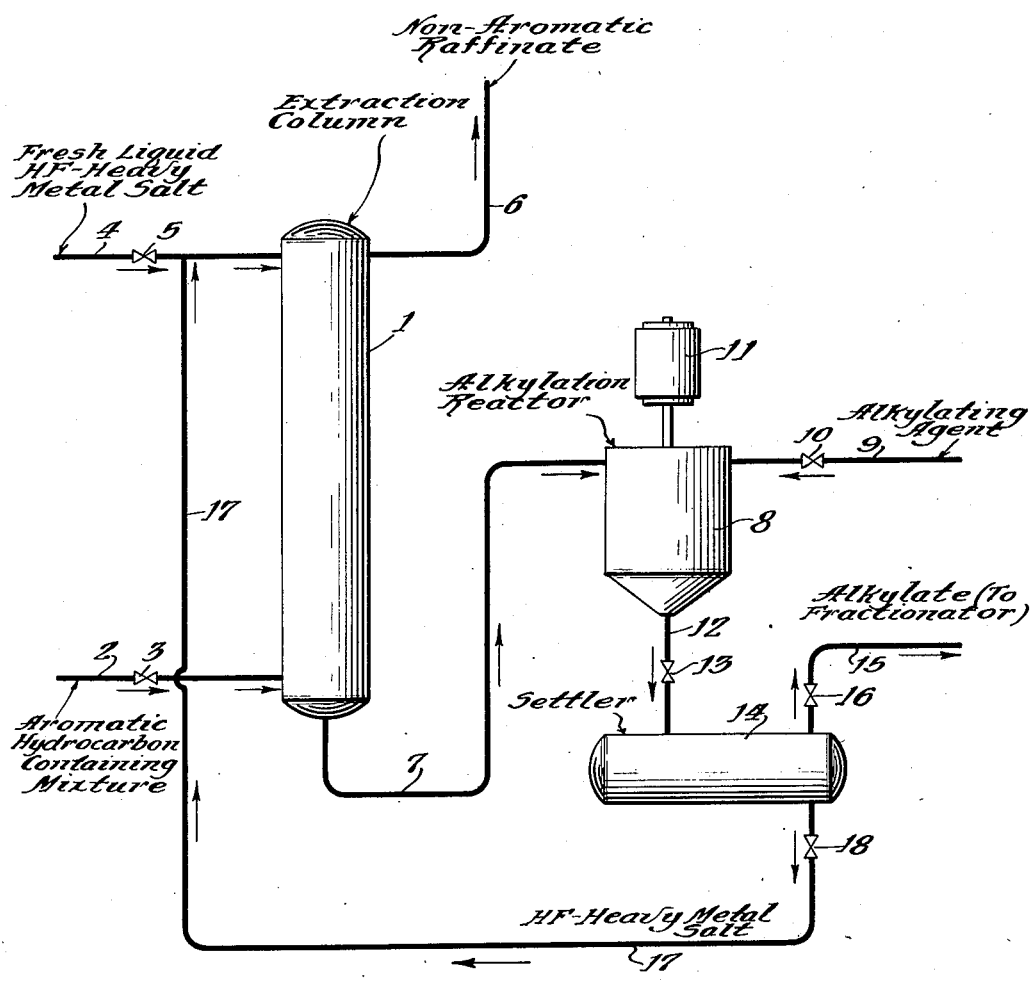

2,639,303

UNITED STATES PATENT OFFICE 2,639,303

PRODUCTION OF ALKYL AROMATIC HYDROCARBONS UTILIZING A COMMON REAGENT AS AROMATIC EXTRACTANT AND ALKYLATION CATALYST

Carl B. Linn, Riverside, and George L. Hervert, Downers Grove, Ill., assignors to Universal Oil Products Company, Chicago, Ill., a corporation of Delaware Application December 30, 1949, Serial No. 135,928

9 Claims. (Cl. 260—671)

This invention relates to an alkylation process which has as its ultimate objective the production of aryl hydrocarbons, particularly of the benzenoid series. More specifically, the invention concerns a combination process involving the extraction of aromatic hydrocarbons from a petroleum fraction containing the same in even small concentrations utilizing a selective solvent which preferentially extracts said aromatic hydrocarbons from paraffinic components also present in said fraction and which is also capable of catalyzing the condensation of the aromatic hydrocarbon contained in the extract phase recovered from the extraction stage with an olefinic hydrocarbon subsequently admixed therewith.

One of the major factors determining the commercial utility of a process involving an aromatic hydrocarbon as one of the reactant materials is the cost of the initial aromatic hydrocarbon. When utilizing a given aromatic charging stock in a particular process and introducing the same into the process flow in a relatively pure form, the cost of starting materials is frequently prohibitive due to the high cost of pure aromatic hydrocarbons and concentrates thereof, such that the process becomes commercially inoperative for practical purposes. Furthermore, in many instances, due to the essential mechanism of the reaction or inherent properties of the reactants, the reaction proceeds and practical yields are obtained only when a relatively concentrated aromatic hydrocarbon charging stock is employed in the process. As an illustrative example of the latter factor operative in typical processes employing an aromatic hydrocarbon charging stock, the yield of alkylate obtained in the condensation of toluene with dodecylene in the presence of sulfuric acid as alkylation catalyst and the quantity of catalyst consumed to form undesirable sludge-like products is directly proportional to the concentration of toluene in the aromatic concentrate charged to the alkylation reaction. The following Table I indicates this relationship:

TABLE I

*The effect of aromatic hydrocarbon concentration in a mixture containing paraffins upon the yield of alkylate and alkylation catalyst consumption*

| Toluene Concentration, Weight Percent | Alkylate Yield, Lbs./Lb. of Olefin Charged | H₂SO₄ Catalyst Consumption, Lbs./Lb. of Alkylate |
|---|---|---|
| 70 | 1.39 | 0.41 |
| 53.5 | 1.20 | 0.53 |
| 20.0 | 1.13 | 0.57 |
| 2.3 | 0.95 | 0.74 |

The above considerations which affect the economics and complexity of many processes employing an aromatic hydrocarbon charging stock is particularly significant and apparent in the alkylation of aromatic hydrocarbons, although these factors likewise operate in such processes as the production of phenolic compounds starting from the corresponding aromatic hydrocarbon, in the oxidation of aromatic hydrocarbons to form the carboxylic acid, ketonic and aldehyde derivatives thereof as well as numerous other processes of diverse character.

It is an object of this invention to provide an economical process for the ultimate production of aromatic hydrocarbon alkylates. Another object of the invention is to devise a method of utilizing inexpensive aromatic hydrocarbon-containing petroleum fractions as a starting material in the production of alkylaryl hydrocarbons, particularly for the manufacture of detergent products therefrom. Still another objective of the invention is the manufacture of an alkylaryl hydrocarbon in a combination process involving extraction and resulting concentration of the aromatic hydrocarbon acting as alkyl acceptor in the formation of said alkylaryl hydrocarbon and condensation of the aromatic hydrocarbon thus extracted with an olefinic hydrocarbon alkylating agent in the presence of an alkylation catalyst which also serves in the capacity of selective solvent in the preceding extraction stage, thus effecting said extraction and said alkylation in a continuous process without intermediate separation of the solvent extractant from the aromatic hydrocarbon recovered in the extraction. The present process provides an effective means of accomplishing these and other objects as will hereinafter appear in the further description of the present invention.

In one of its embodiments the present invention relates to a combination solvent extraction and alkylation process which comprises contacting a mixture of aromatic and paraffinic hydrocarbons with an extractive solvent for said aromatic hydrocarbon comprising liquid hydrogen fluoride containing dissolved therein a salt stable in said hydrogen fluoride and selected from at least one of the group consisting of the silver, gold, platinum, palladium and mercury fluorides, cyanides, and nitrides, separating an extract phase comprising said solvent and said aromatic hydrocarbon and thereafter contacting said extract phase with an olefinic hydrocarbon at alkylation reaction conditions.

A more specific embodiment of the invention concerns a process for the production of a dodecylbenzenoid hydrocarbon which comprises contacting a straight run petroleum fraction boiling from about 70° to about 150° C. with a mixture of liquid, substantially anhydrous hydrogen fluoride and a salt selected from the group consisting of the silver and mercury fluorides, cyanides and nitrides containing from about 1% to about 10% by weight of said salt at a temperature and under extraction conditions to selectively dissolve in said hydrogen fluoride-salt extractant the aromatic hydrocarbons contained in said fraction, separating a resulting extract phase, contacting said extract phase with a mixture of olefinic hydrocarbons containing dodecylene at a temperature of from about −30° to about 30° C. and at other reaction conditions to effect condensation of said aromatic hydrocarbons with said olefinic hydrocarbons, separating a hydrocarbon alkylate product from the alkylation reaction mixture, distilling said hydrocarbon product and separating the fraction therefrom comprising hydrocarbons corresponding in boiling point to said dodecylbenzenoid hydrocarbon.

Other embodiments of the invention relating to specific starting materials and to alternative means of operating the present process will be described in greater detail in the following further description of the invention.

The present process reduced to its essential elements is a combination of a solvent extraction stage in which a mixture of the solvent and at least one aromatic hydrocarbon component is formed and an alkylation stage in which the solvent also serves the purpose of an alkylation catalyst. The process is particularly adapted to the use of a charging stock in the extraction stage containing a low concentration of aromatic hydrocarbons therein, such as a straight run gasoline distillate which contains a relatively high proportion of the aromatic hydrocarbon desired for the ultimate alkylate product. The use of such a charging stock thus provides an economical source of the required aromatic hydrocarbon and enables the production of the alkylate in optimum yields without the interference of other hydrocarbons such as paraffins and naphthenes which act as diluents of the aromatic hydrocarbon and which would otherwise reduce the yield of alkylate if present in the alkylation reaction in admixture with the aromatic hydrocarbon. Another factor of importance in an alkylation reaction employing aromatic hydrocarbon concentrates in which paraffins and naphthenes are also present is the contamination of the catalyst with by-product hydrocarbons. The latter combine and react with the catalyst to form sludge-like products therewith from which the catalyst is subsequently recovered with considerable difficulty necessitating additional processing stages and contaminate the alkylate product with paraffin and cycloparaffin alkylates thus removing olefin alkylating agent from the reaction mixture and reducing the yield of the desired aromatic alkylate from a given charge of olefin in the process. This difficulty is substantially eliminated in the present process by concentrating the desired aromatic hydrocarbon in the alkylation catalyst and separating the same from contaminating paraffins and cycloparaffins introduced as a mixture with the aromatic hydrocarbon-containing charge stock. The present operation is additionally advantageous in that it enables the concentration of the aromatic hydrocarbon to values within operable ranges for effecting alkylation without the necessity of separating the extracted aromatic hydrocarbon from the selective solvent, thus eliminating a step in the customary extraction procedure in which the usual solvents employed do not have the ability to catalyze the alkylation reaction. Furthermore, since merely one reagent is used for both the extraction and alkylation stages, no contamination of the reactants in the system results by virtue of inclusion of the solvent extractant in the alkylation stage. From the standpoint of equipment requirements and operating procedure, the provision in the present process for a single reagent which serves in the dual capacity of an extractive solvent of the aromatic reactant and a catalyst for accomplishing the condensation of the aromatic and olefinic reactants eliminates at least one regeneration or reconcentration stage. Thus, merely one regenerating stage is required instead of the usual two when employing one reagent to effect solvent extraction and another, different reagent to act as alkylation catalyst, each of which would require reconcentration, purification, etc. for recycle to the individual stages of the process.

Suitable aromatic hydrocarbon-containing mixtures for utilization as the initial charging stock in the present extraction stage of the combination extraction-alkylation process may be derived from any source, provided the non-aromatic components in the mixture do not interfere with the extraction or alkylation operations and are non-reactive with the hydrogen fluoride-heavy metal salt extractive solvent. The preferred aromatic hydrocarbons utilizable in the present process are the mono-nuclear or benzenoid hydrocarbons selected from the group consisting of benzene itself and the mono- and dialkyl derivatives in which the alkyl groups contain fewer than three carbon atoms per group, such as toluene, dimethylbenzene, methyl-ethylbenzene, and diethylbenzene, the former being particularly preferred for subsequent alkylation with long chain olefins containing from about 9 to about 18 carbon atoms per olefin molecule for the production of the alkylate intermediate in the manufacture of detergents of the alkylaryl sulfonate type. Mono-nuclear or benzenoid hydrocarbons are preferred in the present process because of the generally greater ease of alkylation and for the additional reason that the alkylate products are more readily separated from the alkylation reaction mixture in the subsequent stage of the process. Further preference is accorded the benzenoid aromatic-containing hydrocarbon charging stocks for the reason that more selective choice of the aromatic hydrocarbon may be obtained by merely charging a distillate fraction boiling within a range in which the desired aromatic hydrocarbon boils. Thus, a straight run gasoline distillate containing from about 5 to about 15% by weight of benzenoid aromatic hydrocarbons in admixture with paraffin and cycloparaffin hydrocarbons may be fractionally distilled to separate a distillate fraction containing a predominant proportion of the particular desired aromatic hydrocarbon. A fraction, for example, boiling normally at from about 70° to about 100° C. at atmospheric pressure will contain aromatic hydrocarbons, the predominant proportion of which is benzene. Likewise, a fraction boiling from about 100° to about 125° C. will contain toluene as the principal aromatic hydrocarbon component thereof. In a similar fashion, other fractions may be separated to provide a charging stock in which the primary aromatic hydrocarbon component is a particular species boiling within the range selected. Straight run gasoline fractions (that is, distillates of crude petroleum) are especially preferred charging stocks in the process since the aromatic component may be extracted therefrom with the present selective solvent almost quantitatively and may be in a substantially paraffin-free condition suitable for immediate charging to the alkylation stage without interference from extraneous paraffin hydrocarbon components. In thus specifying the preferred benzenoid hydrocarbon-containing charging stocks to the extraction stage, it is not thereby intended to restrict the present process to the use of such materials exclusively and depending upon the ultimate use for the alkylate obtained in the secondary alkylation stage, a charging stock may also be selected to provide predominantly poly-nuclear aromatic hydrocarbons, such as naphthalene, mono- or poly-alkylnaphthalenes, anthracene and its derivatives, phenanthracene, etc.

The reagent in the present process serving the dual purpose of extractive solvent for the aromatic hydrocarbon in the extraction stage and as catalyst for the alkylation of the extracted aromatic hydrocarbon with an olefin or olefin-acting alkylating agent is characterized herein as a solution of liquid, substantially anhydrous, hydrogen fluoride containing dissolved therein a heavy metal salt which is stable in the presence of the hydrogen fluoride and which enhances the capacity of the hydrogen fluoride as an extractive solvent and alkylation catalyst. Substantially anhydrous hydrogen fluoride, as specified herein, is intended to designate liquefied hydrogen fluoride containing less than about 5% water by weight and is preferably hydrogen fluoride containing less than 2% by weight of water. The anhydrous reagent is preferred not only because of the incidental advantage of being non-corrosive in steel and stainless steel processing equipment, but further because of its greater solvent extraction capacity for aromatic hydrocarbons in admixture with non-interfering diluents.

The heavy metal salts which in solution with substantially anhydrous hydrogen fluoride enhance the solubility of aromatic hydrocarbons therein and promote the catalytic effect of the hydrogen fluoride in the subsequent alkylation stage are characterized as the salts within this classification which are soluble in anhydrous hydrogen fluoride, are stable in solution with hydrogen fluoride at the operating temperatures and other conditions maintained in the extraction and alkylation stages, and which, in general, are capable of forming addition complexes with the hydrogen fluoride reagent. These salts, in general, include the so-called "noble" metal compounds: silver, gold, platinum and palladium, and, in addition, mercury, fluorides, cyanides and nitrides. Among the preferred salts which serve this purpose are mercurous fluoride (HgF), mercuric fluoride ($HgF_2$), mercuric cyanide (HgCN), mercurous trinitride ($HgN_3$), mercuric nitride ($Hg_3N_2$), silver nitride ($AgN_3$), silver cyanide (AgCN), silver fluoride (AgF), palladium fluoride ($PdF_2$), palladium trifluoride ($PdF_3$), etc. In order to provide suitable aromatic hydrocarbon extractive solvents, the heavy metal salt is preferably dissolved in the hydrogen fluoride prior to the extraction procedure and in an amount of from about 1% to about 10% by weight of the resulting solution.

The olefinic hydrocarbon and olefin-acting alkylating agent introduced into the alkylation reactor together with the extract phase of the prior extraction procedure containing the aromatic hydrocarbon dissolved in the hydrogen fluoride-heavy metal salt extractant, may be selected from any of the generally known alkylating agents accepted as such in the prior art. Depending upon the intended use of the alkylate product, the alkylating agent may contain any number of carbon atoms, generally at least 3 and not more than about 20 per molecule, since the compounds utilizable as alkylating agents containing less than 3 and more than about 20 carbon atoms per molecule are either gaseous or solid at the operating temperatures for effecting alkylation in accordance with the present process and are, therefore, inoperable because of their immiscibility in the alkylation reaction mixture. Thus, the relatively low molecular weight olefins, such as propylene, butylene, isobutylene, amylene, etc. may be charged to the alkylation reaction mixture and maintained therein in liquid phase at the operating temperatures of from about −30° to about 30° C. Relatively high molecular weight olefins such as dodecylene (as, for example, a propylene tetramer), tridecylene (such as a suitably boiling fraction separated from the products of a thermal cracking reaction), tetradecylene, pentadecylene (such as a propylene pentamer), etc. may be charged to the alkylation reactor and may be maintained therein in liquid state at normal pressures and at temperatures of from about 0° to about 30° C. $C_9$ to $C_{18}$ olefins, as for example, a fraction of propylene polymers boiling from about 130° to about 320° C., and preferably a $C_{12}$–$C_{15}$ fraction (boiling from about 170° to about 245° C. of a propylene polymer fraction) are especially desirable for the production of alkylbenzenoid hydrocarbons for ultimate conversion via sulfonation and neutralization of the resulting sulfonic acids, to detergents. Other alkylating agents which act in the capacity of olefins and referred to herein as olefin-acting compounds, include the alkyl halides, such as alkyl chlorides obtained by chlorination of a paraffin hydrocarbon of the desired chain-length the alcohols corresponding in carbon atom content to the desired alkyl group, such as dodecanol for the preparation of a dodecylbenzene alkylate, for example, and the mercaptans corresponding to the chain length desired for the ultimate alkylate group of the final alkylate. The alkylating agent is charged to the alkylation reactor at a rate sufficient to provide an aromatic to alkylating agent molar ratio of from about 0.5 to about 10, and preferably from about 0.9 to about 1.2, the latter ratio being generally preferred to eliminate the necessity of recycling the alkylating agent to the extraction stage for the purpose of separating the aromatic hydrocarbon therefrom and maintaining equilibrium conditions within the system. The use of the latter preferred range of aromatic to alkylating agent ratios eliminates this problem since both the aromatic and alkylating agent components are removed from the alkylation reaction mixture in approximately equal proportions during the alkylation reaction at which the mono-alkyl aromatic hydrocarbons are formed.

The charging rate of the extractive solvent, the aromatic hydrocarbon containing mixture, and the alkylating agent are adjusted in the extraction stage of the process to provide the optimum ratio of reactants, extractive solvent and catalyst in the respective stages. The hydrogen fluoride-heavy metal salt solution utilized in the present process flow as both an extractive solvent and catalyst is charged at a rate sufficient to provide an aromatic to catalyst ratio in the alkylation stage of from about 0.1 pound of aromatic hydrocarbon per pound of catalyst to two pounds of aromatic hydrocarbon per pound of catalyst. In order that this preferred ratio of aromatic hydrocarbon to catalyst will provide a sufficient volume of extractive solvent in the extraction stage of the process (the solvent containing dissolved aromatic hydrocarbons being transferred directly to the alkylation stage), the extractive solvent may be recycled continuously in the extraction stage to remove substantially all of the aromatic hydrocarbon from the hydrocarbon mixture charged to the extraction stage and yet maintain the aromatic hydrocarbon to catalyst ratio within the above specified desired proportions, for effecting the alkylation reaction. The preferred method of operating the extraction procedure involves a system of countercurrent extraction in which the solvent having the greatest density is charged into the top of a vertical column and allowed to flow downwardly, preferably as small, liquid droplets or over a suitable packing material as the aromatic hydrocarbon-containing mixture is charged into the bottom of the column and thereafter permitting the hydrocarbon charging stock to percolate upwardly through the extraction column and out of a suitable vent located at the top of the column. The extraction apparatus may consist of several towers in series and the extractive solvent and/or aromatic hydrocarbon-containing charging stock may be recycled to effect substantially complete removal of the aromatic component from the latter mixture. The extraction stage of the process is desirably conducted at temperatures and pressures which will maintain the hydrogen fluoride in substantially liquid phase during the process. For this purpose, temperatures of from about −10° to about 0° are suitable at atmospheric pressure and up to about 30° C. for mildly superatmospheric pressures.

The extraction-alkylation process is further described and illustrated in the following diagram which represents a typical process flow and one of the alternative methods of operation. It is to be noted that the diagram is illustrative of merely one procedure for effecting the present process and other methods consistent with the process will be readily apparent to those skilled in the art. Referring to the diagram, an aromatic hydrocarbon containing mixture, such as a straight run gasoline distillate is charged into extraction column 1 through line 2 containing valve 3 and allowed to percolate upwardly through extraction column 1 which is desirably packed with a suitable contacting material resistant to the action of hydrogen fluoride, such as copper rivets, stainless steel rings, or bubble plates and risers which distribute the liquid phases therein to obtain maximum contact between the extractant and hydrocarbon mixture introduced into the column. As the hydrocarbon mixture is charged into column 1, the extractant, comprising a liquid hydrogen fluoride-heavy metal salt solution is introduced into the top of the column through line 4 containing valve 5 and may alternatively comprise a mixture of fresh extractant and recycle extractive solvent obtained as hereinafter described. Since the extractive solvent is the more dense phase in the column, it tends to percolate downwardly through the rising column of hydrocarbon mixture in countercurrent relation thereto. The less dense raffinate phase from which the aromatic hydrocarbons have been substantially extracted is removed from the top of the column through line 6 and recycled to the bottom of the column or diverted to a subsequent extraction column in series with extraction column 1 when the raffinate contains residual aromatic hydrocarbons incompletely extracted in column 1. An extract phase comprising liquid hydrogen fluoride and heavy metal salt containing dissolved aromatic hydrocarbons removed during the extraction is withdrawn from column 1 through line 7 and directed to alkylation reactor 8 wherein it is thoroughly mixed with an alkylating agent, such as an olefinic hydrocarbon introduced into reactor 8 through line 9 containing valve 10 which controls the flow of alkylating agent into reactor 8 and consequently the aromatic to alkylating agent ratio during the alkylation reaction. The extract phase or effluent stream from column 1 containing the hydrogen fluoride and heavy metal salt in solution therewith serves as alkylation catalyst in reactor 8, promoting the condensation of the aromatic hydrocarbon and alkylating agent therein. In order to obtain intimate admixing of the alkylating agent, aromatic hydrocarbon and alkylation catalyst, reactor 8 is desirably equipped with a suitable stirring means such as motor driven stir 11. Following completion of the alkylation reaction, usually within a period of from about ½ to about 2 hours in duration, the mixture of hydrocarbons, alkylating agent and catalyst is removed either continuously or intermittently from reactor 8 through line 12 and valve 13 and discharged into settling vessel 14 wherein phase separation occurs while the reaction mixture is allowed to stand quiescent in vessel 14. In some instances, particularly when the alkylating agent is a relatively short chain olefin or olefin-acting compound, such that the resulting alkylate retains its primarily aromatic characteristics, the HF-heavy metal salt mixture retains the alkylate in solution. In such instances, the catalyst phase is separated from the alkylate by fractionation to recover a vaporized hydrogen fluoride distillate and the alkylate and heavy metal salt components separately. Another method for effecting separation of the catalyst phase from the hydrocarbon alkylate phase when such separation does not occur by stratification, comprises adding water to the alkylation reaction mixture until phase separation occurs and thereafter decanting the resulting insoluble alkylate phase from the lower aqueous catalyst phase. In the majority of cases, however, and particularly when the alkylating agent contains a long chain alkyl group, the alkylate is predominantly paraffin in character and separates from the hydrogen fluoride-heavy metal salt catalyst solution. Upon stratification of the alkylate and catalyst phases, the former is removed from settler 14 through line 15 containing valve 16 and diverted, if desired, to a fractional distillation column, not illustrated, for separating the hydrocarbons contained therein into fractions of the desired boiling range. The lower catalyst phase stratifying in settling vessel 14 is removed therefrom through line 17 containing valve 18 and in the preferred method of operation is directly recycled to the extraction column by joining line 17 with solvent supply line 4 leading into column 1 wherein the catalyst serves the purpose of extractive solvent to provide the aromatic hydrocarbon concentrate by extraction, as aforementioned.

The present process is further illustrated with respect to certain specific embodiments thereof

Example I

An alkylate of benzene containing an alkyl group of from about 12 to about 15 carbon atoms per alkyl group may be produced in accordance with the present procedure in the following run.

A Trinidad straight-run gasoline fraction boiling up to about 100° C. and containing approximately 7% by volume of benzene is contacted in a vertical silver-lined extraction column with an extractant consisting of a 3% solution of silver fluoride in liquid 98.5% hydrogen fluoride at approximately 5° C. The extraction column contains silver plated copper Raschig rings to enhance the liquid phase contact between the straight-run gasoline fraction and hydrogen fluoride-silver fluoride extractant. The extraction is effected countercurrently by introducing the extractant into the top of the packed column and permitting the straight-run gasoline fraction to percolate upwardly against a downward flowing stream of the extractant. Approximately equivolumetric proportions of straight-run gasoline and extractant are charged into the extraction column. The extraction is operated continuously and an extract effluent containing approximately 5% by weight of benzene is removed from the column and diverted to an alkylation reactor in which the alkylation stage of the present process is effected as hereinafter described. The raffinate phase which is removed from the top of the extraction column, is substantially free of aromatic hydrocarbons.

The extract phase removed from the extraction column and comprising a hydrogen fluoride-silver fluoride solution of aromatic hydrocarbons consisting predominantly of benzene is charged into a continuous flow, stirred alkylation pressure autoclave and raised to a temperature of about 10° C. at 20 pounds per square inch pressure as a mixture of olefinic hydrocarbons consisting predominantly of dodecylene is charged into the autoclave. The olefinic hydrocarbons were prepared in a previous process by polymerizing propylene over a "solid phosphoric acid" catalyst (a calcined composite of pyro-phosphoric acid and kieselguhr) at a temperature of 350° C. and 120 p. s. i., the propylene polymerization products being fractionated to separate a distillate fraction boiling from about 170° C. to about 225° C. containing principally dodecylene and smaller proportions of pentadecylene. The olefins are added continuously to the hydrogen fluoride, silver fluoride, and benzene mixture in an amount to provide a hydrocarbon mixture containing approximately an equimolar proportion of benzene to propylene polymers on the basis that the olefins have an average approximate molecular weight of 182. The mixture of benzene, olefins and alkylation catalyst is retained in the alkylation reactor at approximately 10° C. and 20 p. s. i. pressure for a residence period of one-half hour and is then discharged into a settling tank wherein a hydrocarbon product phase is permitted to separate from a resulting hydrogen fluoride-silver fluoride catalyst phase. The hydrocarbon phase is removed to a fractional distillation column to separate a dodecylbenzene fraction boiling from about 270° to about 325° C. and the remaining unconverted hydrocarbons recovered as separate fractions are recycled to the alkylation reactor. The lower phase recovered from the settling vessel comprising the silver fluoride liquid hydrogen fluoride solution is returned to the benzene extraction column where it is mixed with sufficient fresh make-up extractant to operate the gasoline extraction stage of the process. The dodecylbenzene and pentadecylbenzene alkylates separated by fractional distillation of the alkylate product represent a combined yield of approximately 65% based upon the benzene present in the extract phase.

Example II

A Trinidad straight-run gasoline fraction boiling from about 100° to about 135° C. and containing approximately 28% by volume of toluene is charged into the bottom of an extraction column and allowed to percolate upwardly through a stream of extractant consisting of a solution of 6% by weight of mercuric fluoride dissolved in hydrogen fluoride of 98.5% purity which flows downwardly and out of the bottom of the column in countercurrent relationship to the gasoline charging stock. The extractant is charged to the column at a rate of approximately three volumes per volume of straight-run gasoline fraction, sufficient to provide an effluent stream containing from about 10 to about 12 volumes of hydrogen fluoride-mercuric fluoride solution per volume of toluene recovered from the gasoline distillate. The raffinate effluent from the extract column contains less than 1% by volume of toluene remaining therein on a once-through extraction basis.

The extract effluent from the toluene extraction is continuously mixed with a propylene polymer fraction boiling from about 170° to about 225° C., comprising a mixture of $C_{12}$ to $C_{15}$ olefin polymers, and the resulting mixture allowed to flow through a tubular reactor maintained at a temperature of about 10° C. and at a pressure of 20 pounds per square inch. The respective streams were charged at a rate sufficient to provide a residence time of the toluene and dodecylene components in contact with the hydrogen fluoride-mercuric fluoride solution of about 45 minutes, the reaction mixture being vigorously stirred as the two streams are mixed and allowed to react. Following the above period of reaction, the alkylation reactor effluent is transferred to a settling vessel in which the hydrogen fluoride-mercuric fluoride solution separates from a resulting hydrocarbon product phase as a lower layer which may be withdrawn or decanted and thereafter recycled to the extraction column for reuse therein as extractant. A yield of approximately 70% of a fraction boiling from about 275° to about 345° C. and comprising principally dodecyltoluene is obtained by fractional distillation of the hydrocarbon phase of the alkylation reaction product.

We claim as our invention:

1. A combination solvent extraction and alkylation process which comprises contacting a mixture of aromatic and paraffinic hydrocarbons with an extractive solvent for said aromatic hydrocarbon comprising liquid substantially anhydrous hydrogen fluoride containing dissolved therein a salt stable in said hydrogen fluoride and selected from at least one of the group consisting of the silver, gold, platinum, palladium, and mercury fluorides, cyanides, and nitrides, separating an extract phase comprising said solvent and said aromatic hydrocarbon and thereafter contacting said extract phase containing said solvent and aromatic hydrocarbon with an olefinic hydrocarbon at a temperature of from about −30° to about 30° C. and other reaction conditions to alkylate the aromatic hydrocarbon with the olefinic hydrocarbon.

2. The process of claim 1 further characterized in that said mixture of aromatic and paraffinic hydrocarbons is a straight-run gasoline fraction.

3. The process of claim 1 further characterized in that the aromatic component of said mixture of aromatic and paraffinic hydrocarbons is predominantly a benzenoid aromatic hydrocarbon.

4. The process of claim 3 further characterized in that said olefinic hydrocarbon contains from about 9 to about 18 carbon atoms per molecule.

5. The process of claim 1 further characterized in that said salt is silver fluoride.

6. The process of claim 1 further characterized in that said extractive solvent contains from about 1 to about 10% by weight of said salt.

7. A process for the production of a dodecylbenzenoid hydrocarbon which comprises contacting a straight-run petroleum fraction boiling from about 70° to about 150° C. with a mixture of liquid, substantially anhydrous hydrogen fluoride and a salt selected from the group consisting of the silver and mercury fluorides, cyanides and nitrides containing from about 1% to about 10% by weight of said salt at a temperature and under extraction conditions to selectively dissolve in said hydrogen fluoride-salt extractant the aromatic hydrocarbons contained in said fraction, separating a resulting extract phase, contacting said extract phase with a mixture of olefinic hydrocarbons containing dodecylene at a temperature of from about −30° to about 30° C. and at other reaction conditions to effect condensation of said aromatic hydrocarbons with said olefinic hydrocarbons, separating a hydrocarbon alkylate product from the alkylation reaction mixture, distilling said hydrocarbon product and separating the fraction therefrom comprising hydrocarbons corresponding in boiling point to said dodecylbenzenoid hydrocarbons.

8. The process of claim 7 further characterized in that said salt is silver fluoride.

9. The process of claim 7 further characterized in that said salt is mercuric fluoride.

CARL B. LINN.
GEORGE L. HERVERT.

References Cited in the file of this patent

UNITED STATES PATENTS

| Number | Name | Date |
|---|---|---|
| 2,378,762 | Frey | June 19, 1945 |
| 2,477,382 | Lewis | July 26, 1949 |
| 2,531,723 | Carnell | Nov. 28, 1950 |

OTHER REFERENCES

Ipatieff et al., Jour. of the Am. Chem. Soc., June 1936, pages 919–22.